(12) United States Patent
Newman et al.

(10) Patent No.: US 10,428,745 B2
(45) Date of Patent: Oct. 1, 2019

(54) CHARGE MOTION CONTROL VALVE AND INTAKE RUNNER SYSTEM

(71) Applicant: Ford Global Technologies, LLC, Dearborn, MI (US)

(72) Inventors: Christopher William Newman, Farmington Hills, MI (US); David Laurinec, Tecumseh, MI (US); Katherine Jane Randall, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 625 days.

(21) Appl. No.: 13/770,853

(22) Filed: Feb. 19, 2013

(65) Prior Publication Data
US 2014/0230781 A1 Aug. 21, 2014

(51) Int. Cl.
| | | |
|---|---|---|
| *F02D 9/10* | (2006.01) | |
| *F02B 31/06* | (2006.01) | |
| *F02B 31/04* | (2006.01) | |
| *F02M 29/06* | (2006.01) | |
| *F02B 31/00* | (2006.01) | |
| *F16K 1/22* | (2006.01) | |
| *F02M 29/02* | (2006.01) | |

(52) U.S. Cl.
CPC ............... *F02D 9/10* (2013.01); *F02B 31/06* (2013.01); *F02D 9/103* (2013.01); *F02D 9/1095* (2013.01); *F02B 31/00* (2013.01); *F02B 31/04* (2013.01); *F02M 29/02* (2013.01); *F02M 29/06* (2013.01); *F16K 1/224* (2013.01); *Y02T 10/146* (2013.01)

(58) Field of Classification Search
CPC .......... F02D 9/10; F02D 9/1095; F02D 9/103; F16K 1/224; F02M 29/02; F02M 29/06; F02B 31/00; F02B 31/04; F02B 31/06
USPC .......................... 123/336–337, 306, 308, 432
See application file for complete search history.

(56) References Cited

U.S. PATENT DOCUMENTS

| | | | | |
|---|---|---|---|---|
| 4,364,352 A | * | 12/1982 | Dluhosch ................. | F02D 9/02 123/323 |
| 5,669,347 A | * | 9/1997 | Cullen ..................... | F02B 31/08 123/306 |
| 5,875,758 A | * | 3/1999 | Fujita ...................... | F02B 27/02 123/184.61 |
| 5,979,401 A | | 11/1999 | Hickey | |
| 6,279,528 B1 | * | 8/2001 | Happenhofer .......... | F02B 27/02 123/184.44 |
| 6,394,066 B1 | | 5/2002 | Chou et al. | |
| 6,827,060 B2 | * | 12/2004 | Huh ......................... | F02B 31/06 123/306 |

(Continued)

FOREIGN PATENT DOCUMENTS

| | | | | |
|---|---|---|---|---|
| DE | 102004005480 A1 | * | 9/2005 | ............. F02B 29/02 |
| EP | 0701057 A1 | * | 3/1996 | ................ F01L 1/44 |

*Primary Examiner* — Mahmoud Gimie
*Assistant Examiner* — Josh Campbell
(74) *Attorney, Agent, or Firm* — Geoffrey Brumbaugh; McCoy Russell LLP

(57) ABSTRACT

A plural port intake manifold with outlets aligned along a common cylinder head plane and each intake port containing, a valve unit including a valve plate that is rotatable by a shaft along an axis of rotation recessed within an inner wall as well as a welded connection encircling each intake port upstream of the axis. The system may allow the use of a plate CMCV that can fully retract into the intake runner when not in use.

17 Claims, 7 Drawing Sheets

(56) References Cited

U.S. PATENT DOCUMENTS

| | | | | |
|---|---|---|---|---|
| 7,293,546 B1* | 11/2007 | Confer | ............... | F02B 31/085 |
| | | | | 123/184.55 |
| 7,455,044 B2* | 11/2008 | Isaji | ............... | F02B 31/06 |
| | | | | 123/306 |
| 7,624,715 B2* | 12/2009 | Goldin | ............... | F02B 31/06 |
| | | | | 123/336 |
| 7,886,713 B2 | 2/2011 | Vichinsky | | |
| 8,056,546 B2* | 11/2011 | Boyer | ............... | F02B 47/08 |
| | | | | 123/302 |
| 2005/0241614 A1* | 11/2005 | Madeira | ............... | F02B 31/085 |
| | | | | 123/336 |
| 2007/0051339 A1* | 3/2007 | Torii | ............... | F02B 31/08 |
| | | | | 123/336 |
| 2007/0144483 A1* | 6/2007 | Torii | ............... | F02D 9/103 |
| | | | | 251/308 |
| 2008/0196872 A1* | 8/2008 | Favier | ............... | F25B 31/00 |
| | | | | 165/159 |
| 2009/0050098 A1* | 2/2009 | Sano | ............... | F02B 31/06 |
| | | | | 123/184.61 |
| 2009/0084335 A1* | 4/2009 | Goldin | ............... | F02B 31/06 |
| | | | | 123/184.53 |
| 2010/0018497 A1* | 1/2010 | Arnold | ............... | F02D 9/1065 |
| | | | | 123/336 |
| 2010/0037846 A1* | 2/2010 | Kobori | ............... | F02B 31/06 |
| | | | | 123/184.56 |
| 2011/0107996 A1* | 5/2011 | Menin | ............... | F02B 31/06 |
| | | | | 123/184.61 |
| 2011/0260086 A1* | 10/2011 | Arnold | ............... | F16K 1/2268 |
| | | | | 251/308 |

* cited by examiner

CHARGE MOTION CONTROL VALVE AND INTAKE RUNNER SYSTEM

BACKGROUND AND SUMMARY

Increased motion of the air and/or fuel charge injected into an engine combustion chamber can increase combustion efficiency under some conditions. For example, charge motion can increase the effectiveness of combustion by introducing air velocity in directions perpendicular to the flow direction. By introducing additional kinetic energy into the combustion chambers, the ignition front may traverse the volume of the combustion chamber more quickly and more evenly so as to interact with a heightened amount of fuel before thermal energy is translated to piston motion. Further, resulting turbulence may increase homogenation of the air-to-fuel mixture within the combustion chamber.

Charge motion control valves (CMCV's) may be used to induce desired turbulence by restricting a portion of the intake passage within the intake manifold. Upon passing through this restriction, air is reflected from the far wall with a horizontal velocity as well as its initial vertical (flow-direction) velocity induced by a pressure differential in the intake system. CMCV's may be controlled by an actuator programmed to create this obstruction during certain, advantageous, operating conditions.

CMCV's may be implemented in a plate-shaft rotation configuration wherein the plate face has a geometry designed to cover a substantial portion of the cross-sectional area of the intake passage when aligned perpendicularly to stream flow, called the fully closed position. In the fully open position the plate may rotate about its shaft such that the width of the plate and shaft obstruct the air passage, allowing substantially more air to pass through. The rotating shafts are generally located through an axis of symmetry on the plate's face or at an edge of the plate adjacent to one wall of the passage.

However, the inventors herein have recognized that in high load situations, the amount of air delivered to the cylinders for combustion acts as a limiting factor for engine power. Likewise, attempts to address this have placed the valve further upstream in a wider portion of the intake passage, but this loss in proximity to the cylinder head port creates losses in the control and effectiveness of the turbulence achievable by the CMCV.

One approach to address this apparent paradox is to configure the intake manifold's ports with outlets aligned to a common head plane and incorporate a rotatable valve (such as a CMCV) with an axis of rotation recessed within an inner wall and a welded connection encircling each intake port upstream of the axis. This may be achieved by integrating the valve into the intake manifold's port during the welding of the intake manifold, for example.

In this way, the proximity to the cylinder head may be preserved without overly restricting the air flow for combustion. Here the CMCV has a shaft housing or "cartridge" around the shaft and the plate projects from this housing. In this implementation, the housing can be inserted into a depression in the intake manifold during the welding of the first and second shells nearest the intake passage. By this method, the CMCV allows unobstructed air flow when not in use thus reducing engine power losses.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The disclosed systems and methods relate to the design and operation of an intake system of an internal combustion engine that may be included in the propulsion system of an automobile. Specifically, intake systems that utilize charge motion control for purposes that may include inducing turbulence within a combustion chamber to homogenize the fuel-to-air distribution. Further, the leading edge of the ignition flame passing through the chamber may be accelerated by this additional motion so that combustion occurs more rapidly and power can be delivered to the crank shaft at the desired point in the power stroke. By restricting a portion of the intake passageway, air is forced into a direction perpendicular to the direction of flow so that when the aircharge enters the chamber it has velocity components in the flow direction as well as the plane orthogonal to the flow direction.

Note that for the purposes of this disclosure the valve is in the "closed" position when it is fully activated and the valve plate fully extended resulting in maximum aircharge flow obstruction. Alternatively, the valve is in the "open" position when deactivated and the valve plate is fully retracted, minimizing or eliminating airflow charge obstruction. Herein, the valve may be, but is not limited to, a charge motion control valve (CMCV).

Passageway restriction may be achieved by use of a plate that obstructs a portion of the passage. However, for a given chamber volume and given fuel injection level, the energy from combustion delivered to the crankshaft is limited by the oxygen available for combustion. It is therefore desirable to allow the maximum amount of aircharge available into the combustion chamber when heightened horse power is desired. Previous embodiments have utilized a rotating shaft within the intake path to rotate the plate so that it is parallel to the flow direction. Though, this does increase the cross section available for aircharge flow, losses are still present. Losses can be eliminated by fully retracting the valve into the intake manifold when not in use. Other embodiments have positioned the valve upstream in the exhaust manifold where the passageway cross section is increased. However, losses in aircharge turbulence can occur throughout the intake downstream of the valve reducing efficiency, thus valve advantages are most pronounced when in close proximity to the combustion chamber fill port.

Figure 1:
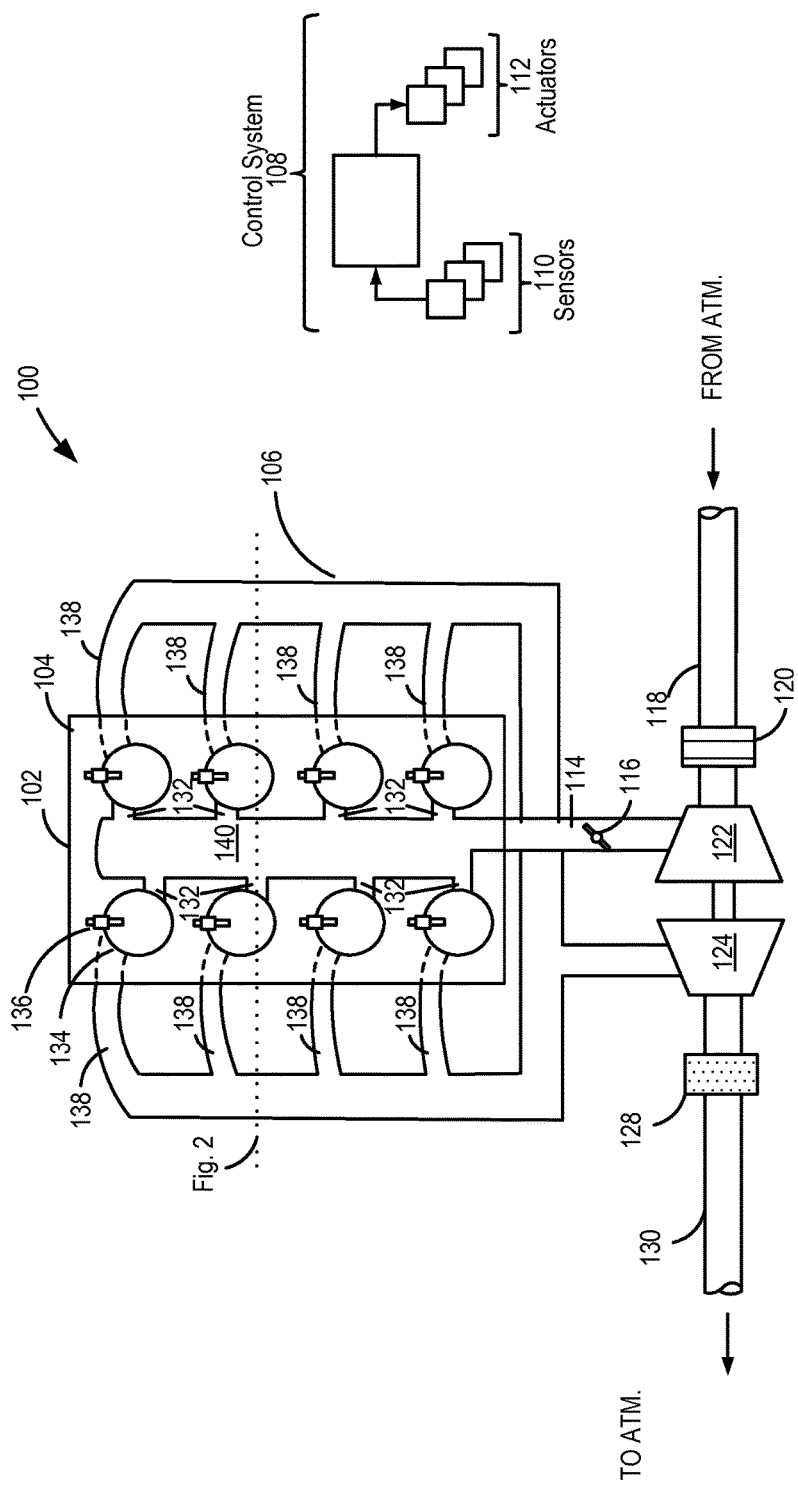
FIG. 1 is a schematic depiction of an exhaust and intake system for an 8 cylinder V-shaped engine compatible with a valve.
Figure 4:
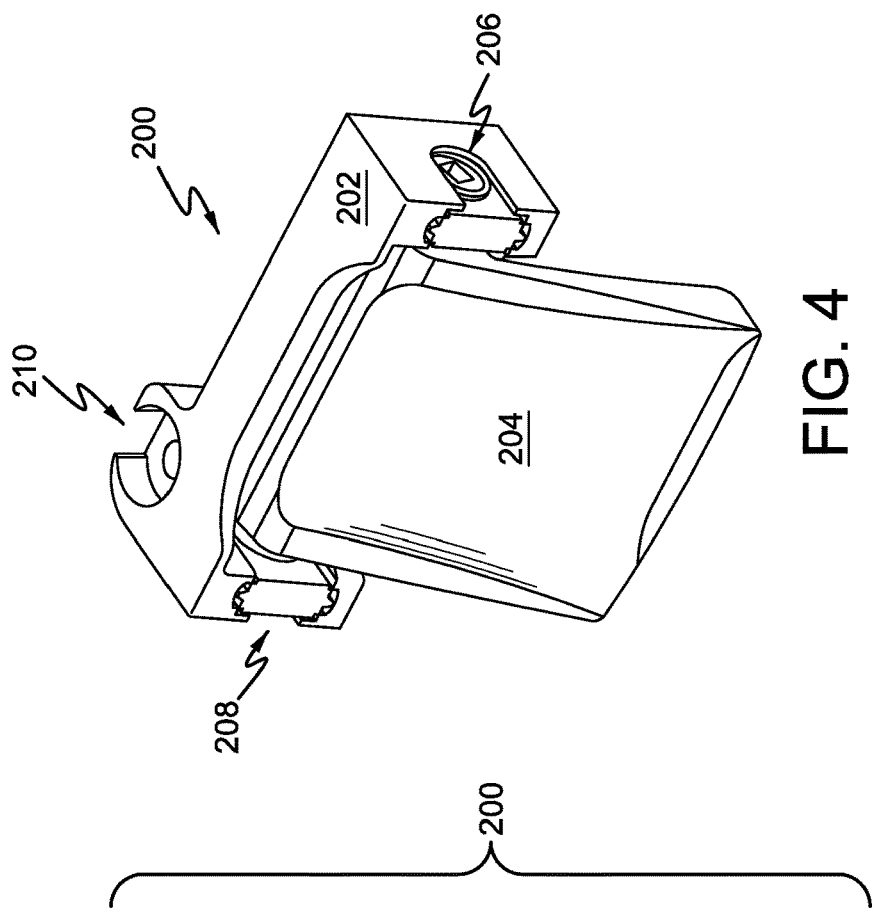
FIG. 4 shows the valve of FIG. 3 fully assembled.
Figure 6:
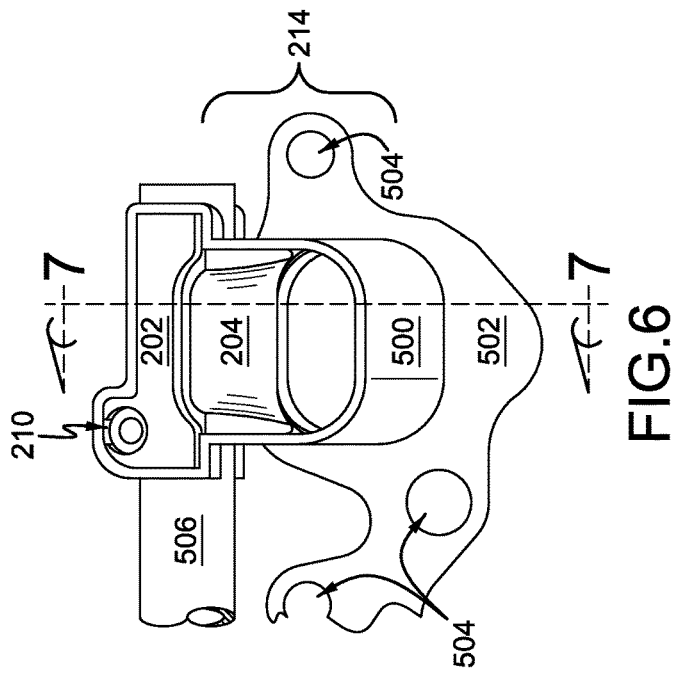
FIG. 6 shows the shell of the intake manifold of FIG. 5 after insertion.
Figure 8:
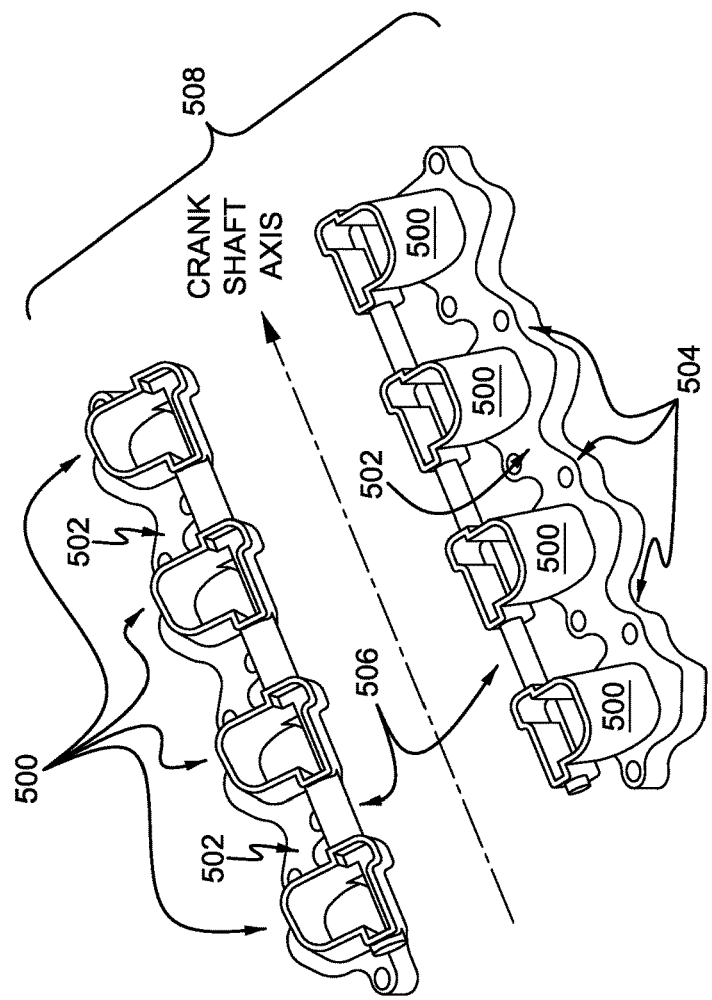
FIG. 8 shows the first shell of the intake manifold prior to valve insertion and welding.
Figure 7:
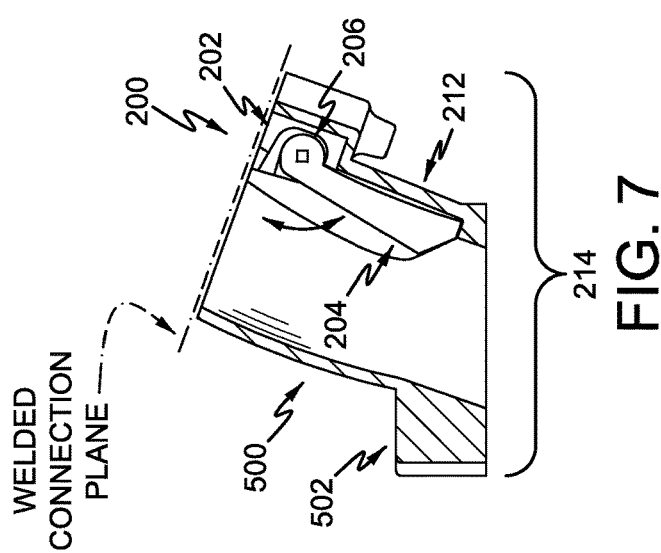
FIG. 7 depicts a cross section of an embodiment of an intake manifold port with an example valve in position.

The schematic representation of FIG. 1 is a simplified intake and exhaust system of an engine that may include an intake manifold that branches upon entering the cylinder head into 8 individual intake paths disposed on respective combustion chambers. The FIG. 1 representation is compatible with the intake manifold of FIG. 2 that depicts a split intake manifold with a valve in the exit port of the intake manifold. The valve unit, consisting of a valve and a cartridge are shown disassembled in FIG. 3, the fully assembled valve unit before insertion into the intake manifold is shown in FIG. 4. The valve unit of FIG. 3 is inserted between the first and second shells of the intake manifold in the manufacturing process prior to welding in the configuration depicted in FIG. 5. FIG. 6 shows the portion of the first shell with the embodiment of a valve in position from a top view, exposing the welding surface of the top shell after valve unit insertion. The cross section of the intake manifold port indicated in FIG. 6 is illustrated in FIG. 7. The first shell in the intake manifold compatible with the embodiment in FIG. 2-7 before welding and valve insertion is shown in FIG. 8. A sample operating method is diagrammatically depicted in FIG. 9 for an embodiment of the valve. A sample manufacturing method is diagrammatically depicted in FIG. 9 for an intake manifold.

The intake and exhaust system depicted in FIG. 1 is compatible with an engine that may include a plurality of cylinders 134. The example engine has 8 cylinders 134 arranged in a V-shaped configuration. In an alternate embodiment, the engine may have two or more cylinders in an inline, boxed, or alternate configuration. Each cylinder 134 may be coupled to a fuel injector 136, to inject fuel directly into the combustion chamber. Alternately, fuel may combine with intake aircharge at a point along the intake path prior to combustion chamber fill.

Cylinders 134 within the cylinder block 102 are coupled to intake manifold 140 via a cylinder head. Intake manifold 140 may branch into a plurality of discrete paths corresponding to individual cylinders 134 such that each cylinder has one or more intake branch(es) 132 disposed on its inlet. Cylinders having multiple intake branches may employ independent valve's or may branch downstream of a singular valve (not shown). Each cylinder 134 may be configured to receive aircharge from the intake branches 132 for combustion. Aircharge may be air from the atmosphere that enters through intake manifold 140, it may also contain recirculated exhaust gas in engines equipped with EGR (not shown). The valve may be integrated into the intake manifold port of intake branches 132.

As is indicated in FIG. 1, embodiments may include a turbocharger with compressor 122 upstream of the intake manifold 140 that is driven by exhaust turbine 124. Intake aircharge may be cooled by one or more cooling devices such as cooler 120. Intake systems may also include a cooling device downstream of compressor 122 additionally or alternatively to a pre-compressor cooler.

Intake aircharge may be metered by throttle 116 within the intake passage 114 communicatively coupled to control system 108 responsive to engine operating demands such as engine load requirements and engine temperature. The throttle 116 may open for a period of time corresponding to a mass of aircharge to be delivered into the combustion chambers via the intake manifold 140 for combustion. Valve actuation may be responsive to throttle actuation and may be used within the control system to monitor engine load. This may be used in combination with sensors measuring atmospheric pressure and/or intake manifold pressure (MAP).

In one example, the valve may be actuated by a first amount in response to an indicated throttle position and may be actuated a second amount in response to an indicated MAP. The first and second amount may be the same direction or in opposing directions with respect to extension or retraction. Further, the valve may fully retract if an indicated throttle position is at a predetermined threshold or if MAP is at a pre-determined threshold. Alternately, the control system may have instructions to extend and/or retract the valve in response to a function of both variables. Valve actuation may be further responsive to temperature, ignition timing, or other conditions not otherwise specified.

In an example exhaust system, exhausted gas may be expelled from the cylinder 134 into exhaust manifold 106 via exhaust passages 138 after combustion. In embodiments utilizing a turbocharger, the exhaust manifold 106 may be coupled to turbine 124. Exhaust gas flowing through exhaust manifold 106 may be treated by one or more exhaust after-treatment devices, such as catalyst 128, before being discharged into the atmosphere via tailpipe 130. In systems employing low pressure EGR, valve actuated recirculation passages may couple exhaust manifold 106 downstream of turbine 124 to intake passage 114 upstream of compressor 122. In systems employing high pressure EGR, exhaust pipe 130 downstream of turbine 124 may be coupled to intake manifold 140 upstream of compressor 118. One or more exhaust gas cooling systems may be present within the intake or exhaust system.

EGR gas generally has some amount of fuel and thus has a higher dew point than atmospheric air. In traditional valves, liquid fuel from EGR may condense onto the actuating shaft and plate obstructing the intake port passageway when not in use. This could, over time, cause build-up within the intake port further obstructing aircharge intake causing an increased loss in fuel efficiency and horsepower over time. In the absence of system maintenance, fuel build-up on the valve could result in valve system and engine degradation. Fully retracting the valve into the intake manifold's inner wall eliminates the surface for condensation reducing fuel build-up, thus preserving the condition of the engine, intake manifold, and valve as well as horsepower and fuel efficiency.

Embodiments may further reduce fuel build-up within the intake manifold by actuating the valve in response to EGR activation. For example, the threshold of EGR activation may correspond to the deactivation of the valve so no obstruction from the valve is present when fuel is present in the aircharge through the intake manifold. Valve actuation may additionally or alternatively be responsive to humidity within the intake manifold reducing the possibility of fuel condensate on the valve. These measures may be in addition to temperature and/or pressure controls regulating the humidity and formation of condensate in the intake system from EGR or atmospheric conditions.

Control system 108 may have instructions to actuate the valve via actuators 112 responsive to input from sensors 110. Input information may include the temperature within the engine or exhaust system so that the valve may be closed if engine conditions fall under a temperature threshold thus inducing turbulence in cold starts. Turbulence within combustion chambers allows for more effective burning, this may be advantageous in cold start situations where losses in combustion efficiency may be pronounced. Embodiments may also actuate the valve to a pre-determined position corresponding to a sensed temperature or other engine load indications. In some examples, actuators 112 may fully retract the valve into the inner-wall of the intake manifold upon sensors 110 indicating that a load threshold is met as determined by control system 108. Full retraction of the valve into the inner-wall of the intake manifold removes passage obstruction so that maximum aircharge can enter the combustion chambers providing maximum horse power.

Figure 2:
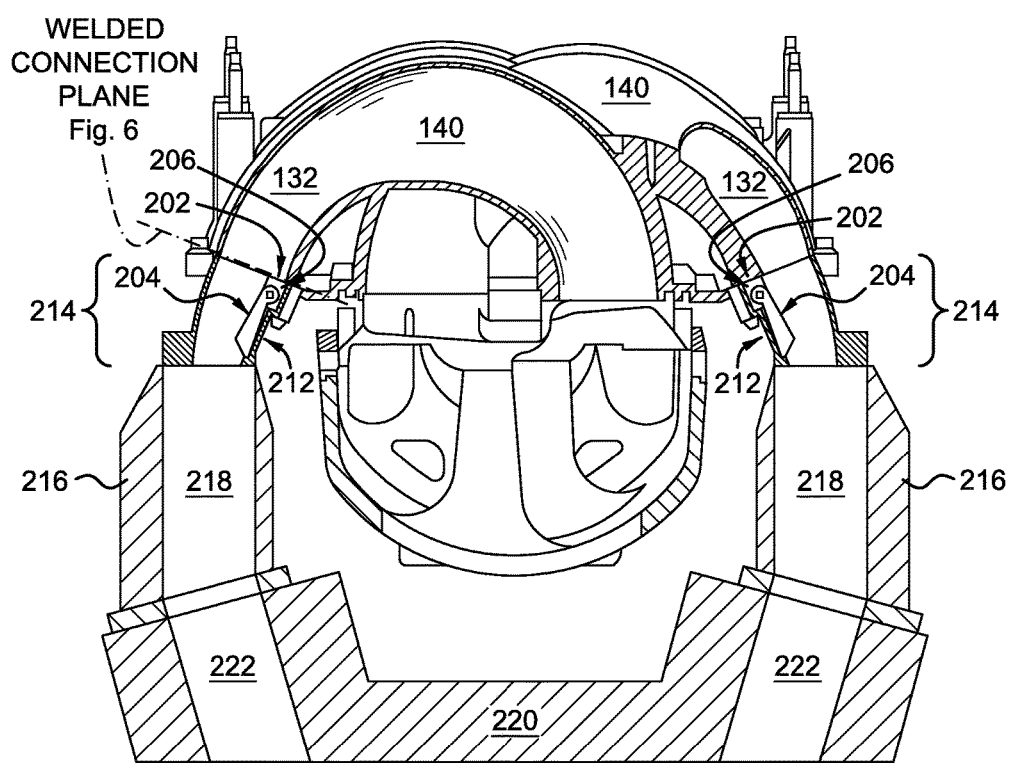
FIG. 2 is a cross section of the system of FIG. 1 within the intake manifold.
Figure 3:
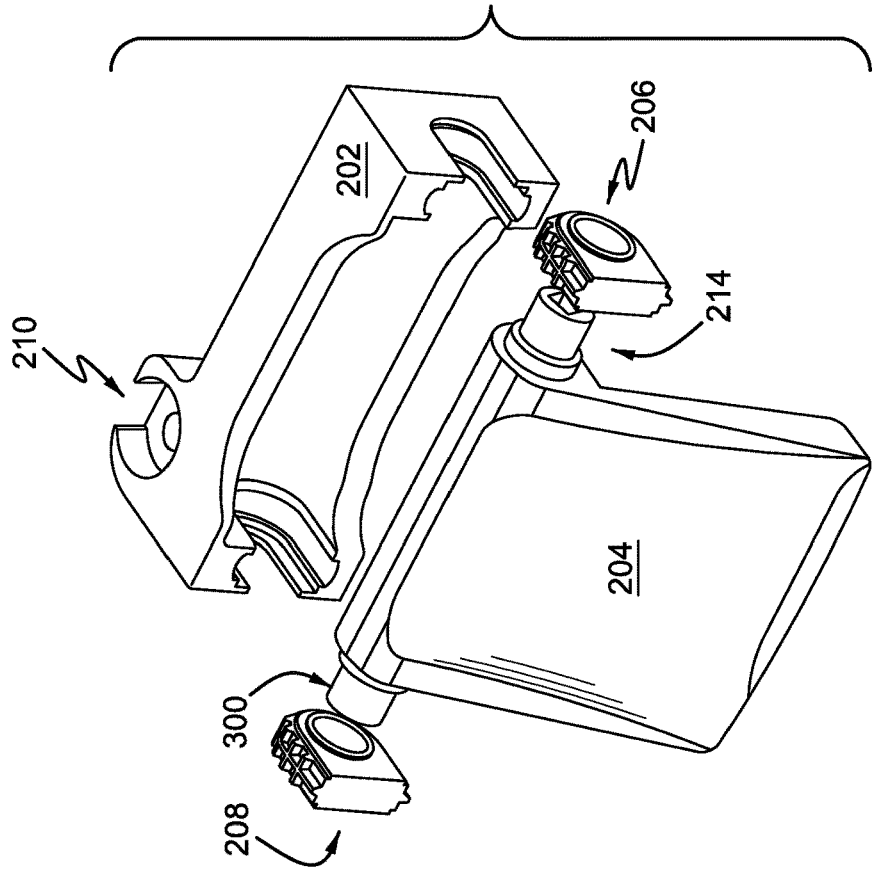
FIG. 3 shows a sample embodiment of a valve disassembled into its components parts.

The cross section of the intake manifold indicated in FIG. 1 is illustrated in FIG. 2. The intake manifold configuration is compatible with an 8 cylinder V-shaped engine wherein 4-cylinders are arranged in-line on two respective banks of the cylinder block 220. In this embodiment a main intake pipe is located along the center of the two banks of in-line cylinders and is parallel to their in-line configuration. The intake manifold 140 and exhaust manifold may be coupled to the cylinder heads 216 which is then coupled to the combustion chambers 222 in cylinder block 220. Intake branches 132 supply aircharge to the two cylinder head passages 218 by alternating branching direction such that each cylinder head passage 218 has one or more discrete branch paths coupled to it. Other embodiments may have two or more branch paths for each respective cylinder head passage 218. The valve may be used upstream of cylinder branching or may be used downstream of branching in one or more of the independent cylinder branches.

Aircharge entering the cylinder head passage 218 may pass through intake manifold 140 before entering an intake branch 132. In this embodiment, intake branches 132 terminate at an intake manifold port 214 where the valve is located. The cylinder head 216 may be connected to the intake manifold at the intake manifold port 214 by an intake flange that acts to secure the cylinder head to the cylinder block, fluidically coupling the intake manifold to the combustion chambers within the cylinder block 220.

If the intake manifold is constructed via a layered-shell welding process, the intake port may be formed by molding independent shells or vertical layers of the manifold where vertical is understood to be perpendicular to the length of the crank shaft (shown in FIG. 8). The intake manifold may be independently constructed prior to combination with other components of the cylinder head.

The horizontal plane of the shells may form the welding surface on which successive shells may be attached. The horizontal plane of the shells may be perpendicular or within 45 degrees of the welded connection plane indicated in FIG. 6. Herein, the first shell is understood to be the shell closest to the cylinder head 216 congruent with the flange. The second shell is the intake shell welded directly to the first shell parallel to the cylinder head. The valve may be integrated into the intake manifold port 214 within the first shell of the intake manifold as shown. The welding surface of the first and second shell is represented by the welded connection line indicated in FIG. 2.

The intake manifold may include a plurality of intake manifold ports 214 with outlets aligned along a common cylinder head plane. Each intake manifold port 214 may contain respective rotatable valves with an axis of rotation recessed within the inner wall. By the method described above, the intake manifold ports 214 containing the valves may be encircled by a welded connection upstream of the axis of rotation. This welded connection may be along the line indicated in FIG. 2, and be adjacent to and upstream of the intake port. The two banks corresponding to the two in-line rows of cylinders in the V-shaped embodiment may each contain a plurality of intake ports with respective valves. The welded connection of the respective intake ports on a single bank may have outlets aligned along a common plane corresponding to the cylinder head plane. The intake ports may be located between the cylinder head and the nearest intake manifold welded connection in the upstream direction.

The intake port inner-wall 212 is the wall closest to the main intake pipe of the intake manifold 140; the outer-wall is the wall closest to the outer wall of the engine block. In this embodiment the intake port cross-section is generally rectangular with rounded corners and is congruent to the face of the valve plate and the plate depression in the intake port wall. Alternate configurations may also have alternate cross section geometries, alternate valve plate geometries, and/or alternate intake-port depression geometries that allow the plate to block a substantial portion of the intake port when fully extended and retract fully into the inner-wall of the intake port when not in use. In this embodiment, the valve plate has a flattened planar surface extending from the stationary edge to the far edge of the plate that slopes outward at both side edges of the plate such that the retracted plate is congruent to, and flush with, the inner wall of the intake port above and below the valve intake wall depression, thus providing a smooth flow surface for aircharge when the plate is not in use. The stationary edge will be understood to be the edge of the valve plate adjacent and parallel to the rotating shaft, the far edge will refer to the edge opposite to the stationary edge of the valve plate and the side edges will be the edges of the plate between and perpendicular to the stationary and far edge of the valve plate. The outward arc direction of the side edges of the plate is understood to be the direction perpendicular to the flat face of the plate, parallel to a vector pointing from the intake manifold toward the outside of the cylinder block. In the extended position the arced side edges of the plate will face the upward direction or the upstream direction within the intake port. Thus, in the extended position, the edges may form a seal with the side walls of the intake port restricting aircharge flow to the air gap between the far edge of the valve plate and the outer wall of the intake manifold port.

FIG. 2 depicts the valve in the fully retracted or deactivated position as may occur if the engine had exceeded a load threshold. Aircharge can therefore exit the intake manifold port 214 into the cylinder without obstruction from the valve plate 204. During extension the angle formed between the valve plate 204 and the inner-wall 212 of the intake manifold port may increase up to a full extension of 90 degrees such that the plate 204 is fully protruding into the intake manifold port 214 obstructing aircharge flow. The degree of obstruction may be metered by a control system communicatively coupled to valve actuator responsive to engine load, temperature, or other operating conditions. Rotation may be achieved by a shaft slot 206 through the stationary edge of the valve plate, in this embodiment the stationary edge is within the inner-wall 212 of the intake port. Alternate embodiments may rotate the plate about a shaft on the far wall or either side wall of the intake port. The shaft may be coupled at one or both ends to a vacuum actuator (not shown) communicatively coupled to the control system. Other actuation mechanisms may also be utilized for charge plate rotation about the rotation shaft and shaft slot 206.

As indicated in FIG. 2, the rotation shaft within shaft slot 206 and the valve plate's stationary edge is supported by cartridge 202. Cartridge 202 is positioned inside a depression within the inner-wall of the intake port such that the outer-edge of the cartridge does not extend past the inner-wall 212 of the intake manifold port 214 so that aircharge flow is unaffected by the presence of the cartridge 202. Upon the welding of the second shell to the first shell the cartridge depression forms a cavity congruent to the cartridge shape.

Turning now to FIG. 3, the valve unit is shown prior to assembly and insertion into the intake manifold port. The valve unit 200 is separated into four component parts: the plate 204, the cartridge 202, and two bushings 208. The bushings may be rubber, plastic, or other dampening material. The plate 204 is depicted with tubing 300 protruding from, and parallel to, the plate's stationary edge, the tubing 300 acts as a vessel to rotationally couple the plate to the shaft (not shown) therein. The cartridge is a case that retains the valve parts and mechanically couples them into a single unit that can be inserted into the intake system. In this example the bushings encompass a portion of the plate 204 (specifically, the tubing) and the cartridge encompasses the bushings. The plate 204 and bushings 208 comprise the valve retained by the cartridge 202 to form the valve unit 200 in this embodiment. In other embodiments the valve may be composed of other components and the valve unit may or may not include a cartridge or additional components.

Shaft slot 206 is bore linearly through the plate near its stationary edge and parallel to the stationary edge of the plate. An actuating shaft (not shown) may be rotationally coupled to the plate 204 in a "skewering" configuration in which plate 204 is "skewered" by a shaft through shaft slot 206, thus defining the plate's axis of rotation. Rotational actuation may result from a groove and notch coupling of the shaft and shaft slot 206 and/or other fastening mechanisms. Further, in some embodiments, the shaft may comprise a plurality of smaller shafts fastened to either or both side edges of the plate near the stationary edge and at the axis of rotation. As depicted in FIG. 4, rotation of the plate may be supported by a tubing protruding perpendicularly from the sides of plate 204 extending shaft slot 206. The tubing may be housed in cartridge 202, securing the rotational shaft within the cartridge 202 so that the shaft may actuate the plate 204 from within the cartridge and extend through the two faces of the cartridge that are parallel to the side edges of the plate, referred to as the side of the cartridge. Note that the top of the cartridge refers to the face of the cartridge parallel to the stationary edge of the plate when the plate is fully retracted; the front of the cartridge refers to the face of the cartridge adjacent to the open portion of the intake port passageway; the back of the cartridge refers to the face parallel and opposite to the front of the cartridge; and the bottom of the cartridge refers to the face parallel and opposite to the top of the cartridge.

The cartridge may have rectangular top, bottom, front, and back where the shorter end of each face is adjacent to the side of the cartridge and may have a cusp with a hole bore from top to bottom for a bolt that may further fasten the valve to the first shell of the intake manifold. The cartridge sides may be square. A U-shaped cavity (as viewed from the cartridge sides) may have an opening on the front of the cartridge corresponding to the shaft or shaft slot tubing of the plate that runs along the rotational axis of the plate 204. Embodiments of the cartridge side may have width and height extending 5 or fewer millimeters beyond the diameter of the shaft slot tubing such that the cartridge in its entirety is a less than 33% of the length of the plate as measured from the stationary edge to the far edge. Further, the shaft may have notches near both cartridge sides running along the U shaped perimeter of the U-shaped cavity, extending in an outwardly radial direction from the rotational axis. These notches may correspond to bushings 208 that may secure the shaft slot tubing within the cartridge.

The shaft extending along the stationary end of plate through the (optional) shaft slot tubing and exiting through the sides of the cartridge may terminate on one or more valve actuator(s) (not shown). The valve may have a hole 210 for a bolt that may be used to secure the valve to the intake port. Bushings 208 may act to further secure the valve plate 204 to the cartridge 202. The bearings may have a hole through their width configured to support tubing 300 and allow rotation whilst securing the valve plate's stationary edge to the cartridge 202.

Figure 5:
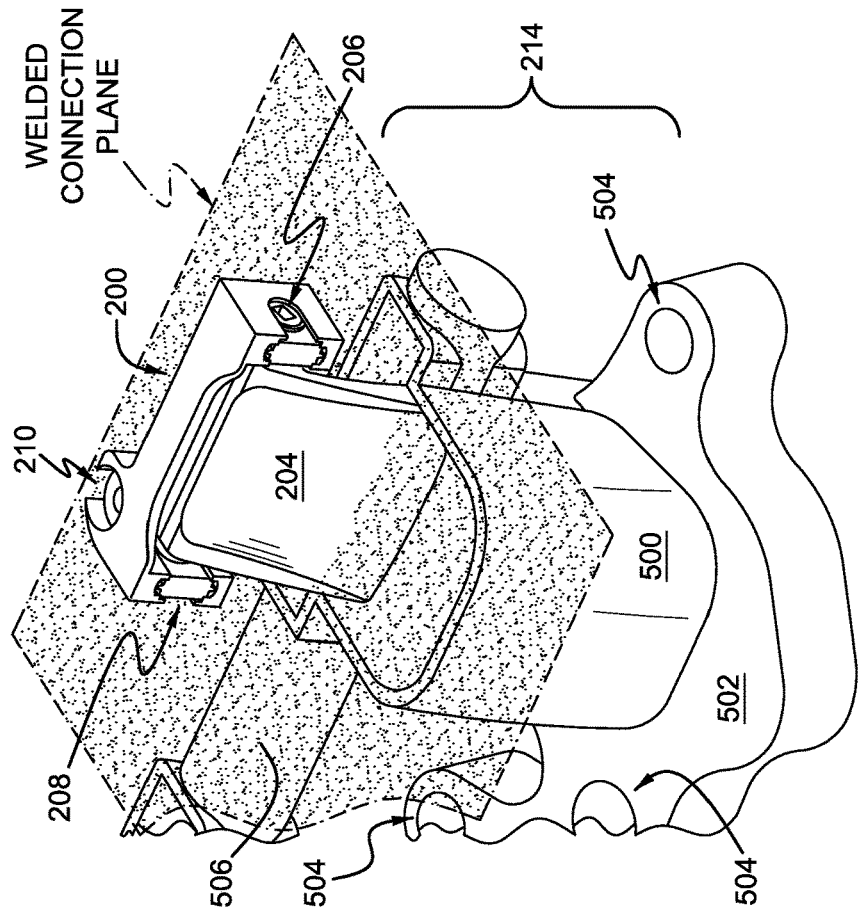
FIG. 5 shows the valve as it is inserted into a shell of the intake manifold.

A sample intake manifold port within the first shell is depicted in FIG. 5 with valve unit 200 is partially inserted therein. The intake manifold assembly step depicted in FIG. 5 may occur before the welding of the first intake manifold shell to the second intake manifold shell. Generally, the intake manifold is fully constructed prior to its coupling to the cylinder head via the intake flange 502. Flange 502 may secure the first shell of the intake manifold to the cylinder head via connectors through holes 504.

As depicted in FIG. 5, the assembled valve unit 200 may be inserted into the a similar depression in the first shell of the intake manifold from the welding edge of the second shell of the intake manifold, referred to herein as the top. The cartridge 202 may rest on a lip in the depression intake port and be further secured by a fastener through hole 210 to the intake port. Valve plate 204 may also rest within an adjacent intake manifold depression such that, when the plate is in the fully retracted position, the port inner surface is flush with the walls of the intake port surrounding the plate 204.

Valve plate 204 may have side edges that are perpendicular to the stationary edge and a far edge opposite the stationary edge. In this embodiment, the side edges curve outward so as to form a seal when the valve is retracted such that the surface of the plate 204 has a shape similar to the inner-wall of the intake port above and below the valve. This plate geometry used in congruence with the appropriate intake port depression to create a smooth flow surface on all sides of the intake port when the valve is fully retracted, further, it preserves the aircharge flow cross-section throughout the length of the valve. Similarly, when the valve is closed, curved side edges of the valve create a smooth flow path for aircharge intake to travel through the opening, sealing the desired portion of the intake passage.

The welded connection plane in FIG. 5 indicates the plane along which the welded connections may be aligned for a respective cylinder head bank. It may be parallel to the shaft of the rotating valve. The intake manifold may have a depression in which the cartridge is located, downstream and adjacent to the welded connection. The intake manifold surface upstream and adjacent to the welded connection may form a ridge to secure the cartridge and valve into the intake manifold. A further depression may extend from the cartridge depression in the intake port that is congruent with the valve plate. This may allow the valve to have flush positioning when fully retracted so that its outer surface aligns with the interior surfaces of the port.

The cross section indicated in FIG. 6 is shown in FIG. 7. Here, the depth of the curved side edges can be seen at the side edge of the plate. The flattened middle of the plate 204 is flush with cartridge 202 and the inner-wall of the intake port below the valve. Similarly, the cartridge is flush with the inner-wall of the intake port above the valve. Cartridge 202 rests on a lip in the inner-wall 212 depression perpendicular to the aircharge flow direction. The flat center surface retracts fully into a shallower depression in the inner-wall of the intake port the length of the valve. The first shell may be attached to the cylinder block via flange 502.

When the valve is closed and the valve plate extended, aircharge flow is restricted to an opening between the far edge of the valve plate 204 and the outer-wall 500 of the intake manifold port, as confined by the side walls.

FIG. 8 depicts the first shell of an intake manifold 508 configured for an 8-cylinder V-shaped engine, compatible with a valve embodiment before its insertion. Similar intake manifolds may be arranged for engines of different configurations and cylinder number. In this embodiment, an actuating shaft may traverse two respective tubular housings 506 corresponding to the two sets of 4 in-line intake manifold ports 500. The intake manifold port depressions for the cartridge are aligned parallel such that in-line valves may be rotationally coupled to a single actuating shaft in the skewered configuration. In some embodiments, the cylinders may be arranged into a single line corresponding to a single line of intake manifold ports and may include two or more cylinder-port couplings therein. Parallel configurations, such as the V-shaped engine, may have one or more intake manifold ports in either alignment line.

The actuating shaft of the valve may be coupled to one or more additional valves and an actuator communicatively coupled to the control system. In the above embodiment, the two alignment lines of intake ports and the valves therein may be actuated by two respective shafts. In other embodiments individual valves may be actuated independently.

The first shell of an intake manifold 508 depicted in FIG. 8 may be fastened to the cylinder head by flange 502 and fasteners such as bolts through holes 504. The valve may be inserted from the top of the first shell and the top surface of a first shell may then be welded to the bottom surface of the second shell along a horizontal face. Here the horizontal face is understood to be the face of the manifold shell within the plane traversing the cross section of the intake manifold ports 500.

Figure 9:
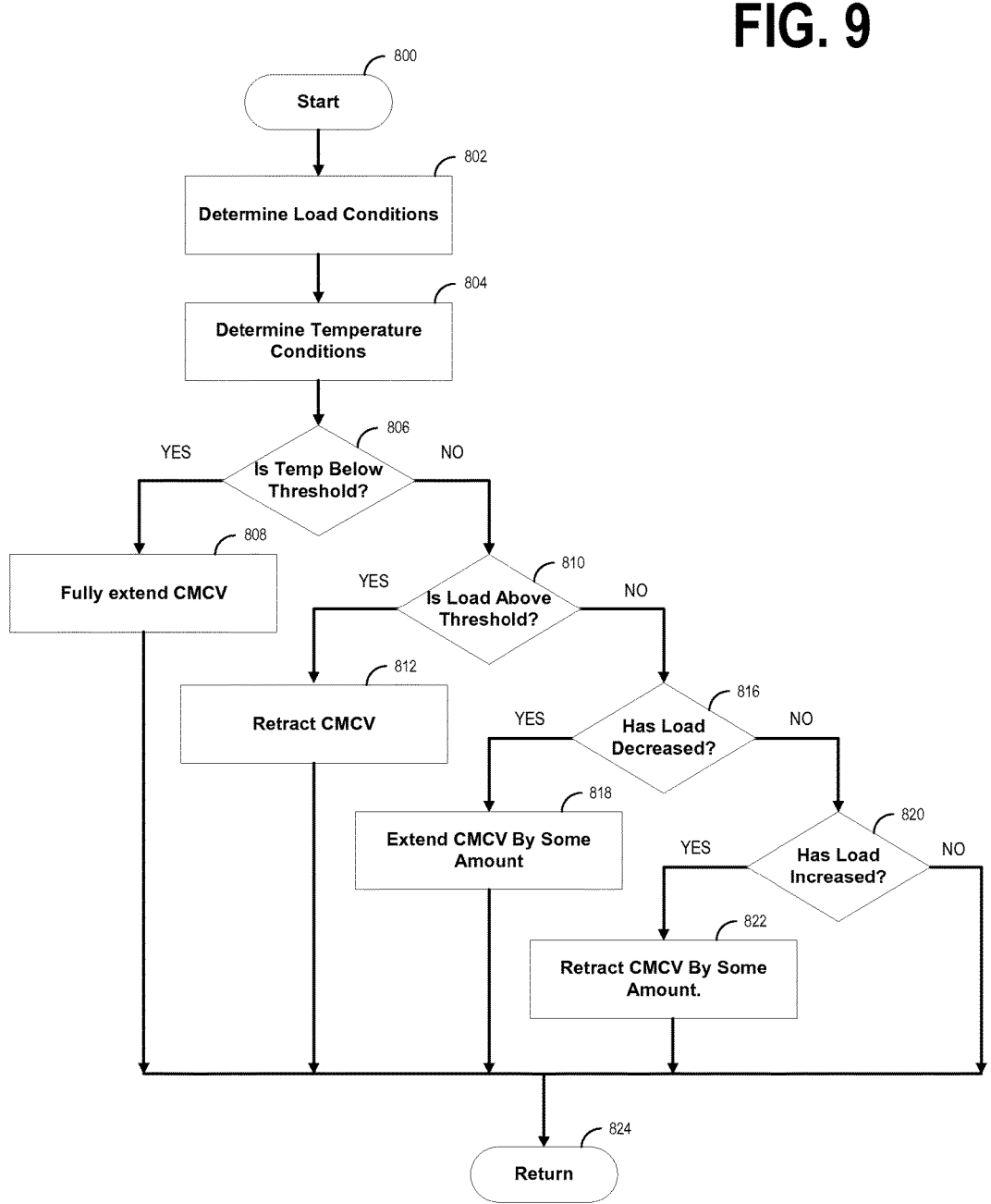
FIG. 9 diagrammatically depicts a simplified method of operation of a valve.

An example method of valve actuation is diagrammed in FIG. 9. Load conditions may be determined at 802 within a control system responsive to a plurality of sensors throughout the vehicle and engine system. Sensors may determine throttle position, MAP, temperature sensors, thermostat setting, ignition timing, humidity or other condition not otherwise specified. Temperature conditions may also be determined within the exhaust manifold or cylinder head and may be indicative of engine operating temperature at 804. Engines operating at low temperatures due to atmospheric conditions or inactivity experience a loss of combustion efficiency resulting in lower fuel efficiency and higher emissions. In an example method, if the engine is below a temperature threshold the valve may be closed with its plate fully extended at 808 creating maximum intake port obstruction and corresponding turbulence, thus increasing combustion efficiency. The process may then repeat at 824.

If the temperature within the engine or exhaust manifold is not found to be below a threshold at 806 it may be determined if the engine load is above a threshold at 810 by one of the aforementioned methods that may also include temperature. This predetermined threshold may correspond to an engine load that relies on maximum aircharge intake. If engine load threshold is achieved, the valve may be opened and its plate fully retracted into the inner-wall at 812 so that no obstruction to aircharge intake is introduced by the valve. If this threshold has not been achieved, it may be determined if the load has decreased at 816. If the engine load has decreased the valve may be extended by some amount at 818, increasing aircharge turbulence in successive combustions. Else, it may be determined if the load has increased at 820. If the load has increased the valve may retract by some amount at 822 to allow increased aircharge flow to meet the demands of the increased engine load before repeating the method at 824.

In other embodiments, the position of the valve may be monitored within the control system and may be determined by previous actuations stored in memory or by position sensors. The control system may have a predetermined valve-position-to-load-condition correlation such that the valve is not actuated in response to previous load conditions but instead actuated to a position in response to presiding load conditions.

Figure 10:
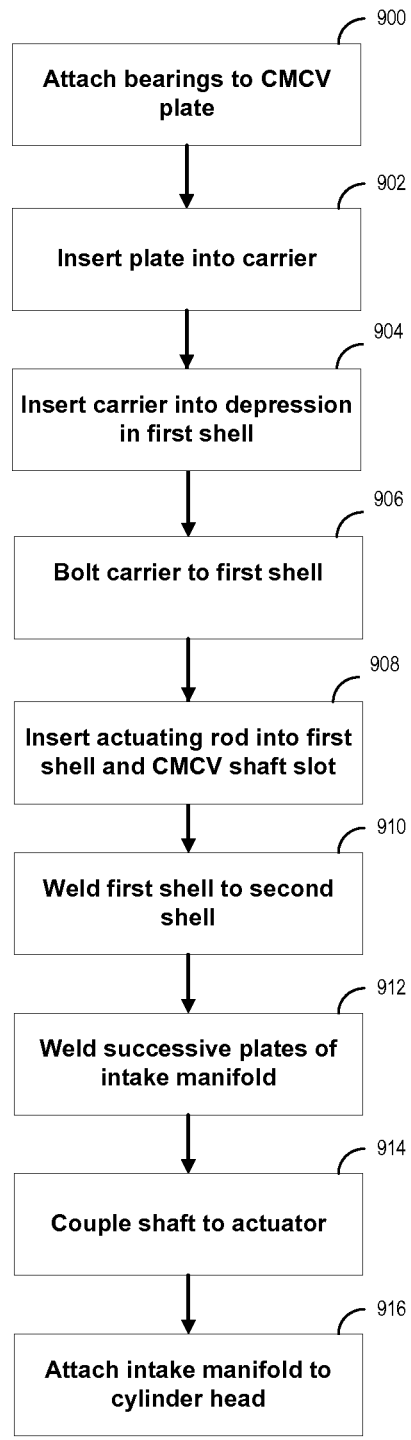
FIG. 10 diagrammatically depicts a simplified manufacturing method of intake system.

An example manufacturing process of the intake manifold utilizing the valve system disclosed is diagrammed in FIG. 10. The assembly process depicted includes attaching the bearings to the valve plate at 900 then inserting the plate into the opening in the cartridge at 902. The assembled valve unit (200 as shown in FIG. 4) is then inserted into the top of the first shell of the intake manifold at the horizontal or welding surface at 904. The cartridge may be secured to the intake manifold by a bolt at 906. This process may be repeated for each valve coupled to a single actuating shaft. The shaft may then be inserted through the intake manifold traversing each valve unit via its respective shaft slot at 908. The second shell of the intake manifold may then be welded to the first shell of the intake manifold at 910. Successive shells may be welded to form an intake manifold at 912. A shaft actuator communicatively coupled to a control system may then be coupled to the actuating shaft at 914. The manifold may then be attached to the cylinder head via an intake manifold flange at 916.

Some engines may be configured to have cylinders each with two or more passages each coupled to aircharge mixtures of different fuel-to-air compositions. As an example, "Siamese" intakes may have two intake ports for a respective cylinder. A lean fuel mixture (air mass greater than fuel mass) may enter through a first passage and a rich fuel mixture (fuel mass greater than air mass) may enter through a second passage. The disclosed valve may be used in each passage to the cylinder head such that a first valve meters the flow of the lean fuel mixture and a second valve meters the rich fuel mixture. Turbulence may be created by modulating the intake of each aircharge where the obstruction of the respective intake passages works in conjunction with the motion created by the density discrepancy between the two fuel mixtures. This embodiment will offer the aforementioned advantages resulting from the full retraction of the valve into the intake passage inner-wall as well as increased fuel mixture moderation precision as the two passages may be independently actuated.

Note that the example control and estimation routines included herein can be used with various engine and/or vehicle system configurations. Further, this technology can be applied to any type of powertrain including, but not limited to, powertrains associated with pure electric, hybrid electric, plug-in hybrid electric, fuel cell electric, and diesel engine powered vehicles. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An intake manifold, comprising:
a plurality of intake ports with outlets aligned along a common cylinder head plane, where each of the plurality of intake ports includes an inner surface;
a plurality of valve units, where each of the plurality of valve units is inside a corresponding intake port of the plurality of intake ports, each of the plurality of valve units surrounded by the inner surface of the corresponding intake port, and where each of the plurality of valve units includes:
a valve plate, the valve plate rotated about a stationary end of the valve plate,
tubing protruding from the stationary end of the valve plate and extending parallel to the stationary end on both sides of the valve plate,
bushings surrounding the tubing on both sides of the valve plate,
a cartridge that retains the stationary end of the valve plate, where the cartridge includes a U-shaped cavity at each end of the cartridge, and where the bushings and the tubing are positioned within each of the U-shaped cavities, a top of a U-shape for each of the U-shaped cavities being an opening on a front of the cartridge, where the openings on the front of the cartridge are covered by the inner surface of the corresponding intake port; and
a welded connection encircling each intake port upstream of an axis of rotation.

2. The intake manifold of claim 1, wherein the valve plate comprises a shaft slot at a stationary end thereof and where the tubing extends the shaft slot, the valve plate rotated by a shaft extending through the tubing and along the axis of rotation recessed within an inner wall, and wherein the valve plate is rotated about the stationary end.

3. The intake manifold of claim 1, wherein the valve plate has a face with a same shape and dimensions as a cross sectional area of the corresponding intake port so that, when in a fully extended position, the valve plate blocks air flow through the corresponding intake port and the valve plate has an arc at both side edges away from an inner wall of the corresponding intake port with respect to a fully retracted position congruent to an arc of the inner surface of the corresponding intake port.

4. The intake manifold of claim 1, wherein the bushings secure the tubing within the cartridge, and wherein the welded connection encircling each intake port is positioned between an intake branch of the intake manifold and the intake port of the intake manifold, the intake manifold independently constructed prior to combination of the intake manifold with other components of a cylinder head.

5. The intake manifold of claim 1, wherein each intake port is adjacent to the welded connection and the welded connections are aligned along a common plane parallel to a crank shaft axis, and wherein a shaft rotating the valve plate traverses two tubular housings of the intake manifold.

6. An intake manifold, comprising:
a plurality of ports with outlets aligned along a common head plane;
a plurality of valve units, where each of the plurality of valve units is positioned within a corresponding port of the plurality of ports, each of the valve units including:
a valve plate, the valve plate comprising a shaft slot at a stationary end thereof and a tubing that extends the shaft slot, the tubing protruding from and parallel to the stationary end of the valve plate, and wherein the valve plate is rotated by a shaft extending through the tubing;
a cartridge positioned within a depression that is formed by walls of the corresponding port, and where a passage of the corresponding port is formed by the walls of the corresponding port, where a length of the depression is greater than a width of the passage, the length of the depression parallel to the width of the passage, the cartridge retaining the stationary end of the valve plate, the cartridge secured into the corresponding port by an intake manifold ridge, and
bushings that secure the tubing within the cartridge, where the cartridge includes a U-shaped cavity at each end of the cartridge, and where the bushings and the tubing are positioned within each of the U-shaped cavities, a top of a U-shape for each of the U-shaped cavities being an opening on a front of the cartridge that is covered by the walls of the corresponding port, wherein an inner surface of the walls of the corresponding port cover the openings on the front of the cartridge; and
a welded connection encircling each port upstream of the shaft and an inner wall ridge positioned at the welded connection.

7. The intake manifold of claim 6, wherein the depression is congruent to the cartridge, and wherein the cartridge has a rectangular top, a rectangular bottom, a rectangular front, and a rectangular back, and wherein sides of the cartridge are square.

8. The intake manifold of claim 6, wherein the depression is downstream and adjacent to the welded connection.

9. The intake manifold of claim 6, wherein the bushings are rubber bushings within the cartridge.

10. The intake manifold of claim 6, wherein the shaft is coupled to the plurality of valve units within respective ports of the plurality of ports, and where the valve plate has flush positioning when fully retracted so that the valve plate is aligned with interior surfaces of the corresponding port.

11. The intake manifold of claim 6, wherein each cartridge is located in the intake manifold between a cylinder head and the welded connection of the intake manifold nearest the cylinder head.

12. The intake manifold of claim 6, wherein the openings of the U-shaped cavity open in a direction towards a passage of the corresponding port.

13. The intake manifold of claim 12, wherein the inner surface of the walls of the corresponding port further cover the bushings and the tubing that are positioned within each of the U-shaped cavities.

14. A method for operating an intake system of an engine, comprising:
controlling intake of aircharge from an intake manifold to a combustion chamber within a cylinder block by actuating a valve that is positioned in a port of the intake manifold; and
retracting the valve fully into the intake manifold when not in use, the valve including a valve plate which comprises a shaft slot at a stationary end thereof and a tubing that extends the shaft slot, wherein the valve plate is rotated by a shaft extending through the tubing, where bushings encompass portions of the tubing and secure the tubing within a cartridge that is positioned within the port of the intake manifold, the bushings fitting within a U-shaped cavity that is at each end of the cartridge, a top of a U-shape of each of the U-shaped cavities being an opening on a front of the cartridge, where the openings of the U-shaped cavities on the front of the cartridge are covered by an inner surface of the wall of the port.

15. The method of claim 14, wherein the valve is actuated by a control system including instructions responsive to engine load and temperature conditions.

16. The method of claim 14, wherein the aircharge includes a mixture of partially combusted exhaust gas from an EGR system and intake air.

17. The method of claim 14, wherein actuating the valve is responsive to activation of EGR.

* * * * *